US006904664B1

(12) United States Patent
Cattell

(10) Patent No.: US 6,904,664 B1
(45) Date of Patent: Jun. 14, 2005

(54) WORK-PIECE POSITIONER AND METHOD

(75) Inventor: Timothy M. Cattell, Springfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/791,465

(22) Filed: Mar. 2, 2004

Related U.S. Application Data

(62) Division of application No. 10/244,205, filed on Sep. 16, 2002.

(51) Int. Cl.[7] .............................................. B23Q 1/25
(52) U.S. Cl. ......................................... 29/559; 269/71
(58) Field of Search ........................... 269/71–72, 4–5, 269/82–85, 20, 74; 403/96, 97; 29/559

(56) References Cited

U.S. PATENT DOCUMENTS

| | | | |
|---|---|---|---|
| 3,888,362 A | 6/1975 | Fletcher et al. | |
| 4,253,649 A * | 3/1981 | Hewson | 269/45 |
| 4,350,067 A * | 9/1982 | Picard | 269/296 |
| 4,598,919 A | 7/1986 | Letard et al. | |
| 4,771,980 A | 9/1988 | Dubbs | |
| 4,949,944 A | 8/1990 | Groff, Sr. | |
| 4,973,215 A | 11/1990 | Karten et al. | |
| 5,128,838 A | 7/1992 | Brandess | |
| 5,280,892 A * | 1/1994 | Smith | 269/75 |
| 5,549,287 A | 8/1996 | Loucks | |
| 5,793,016 A | 8/1998 | Colling et al. | |
| 5,947,407 A | 9/1999 | Quigley | |
| 5,971,348 A | 10/1999 | Thomas | |

* cited by examiner

Primary Examiner—Robert C. Watson
(74) Attorney, Agent, or Firm—Rankin, Hill, Porter & Clark LLP; Vincent Ciamacco

(57) ABSTRACT

A positioner includes a cantilever arm that defines a first axis and has a first end and a second end. A support arm defines a second axis and has a first end and a second end. The support arm is attached to the cantilever arm second end. A mounting head engages the workpiece and is attached to the support arm second end. The support arm rotates around the second axis, and the cantilever arm rotates around the first axis. A counterweight is attached to the support arm to balance the workpiece. A first brake assembly engages the cantilever arm to control rotation of the cantilever arm around the first axis. A second brake assembly is disposed between the cantilever arm and the support arm and controls rotation of the support arm around the second axis. A brake actuator assembly communicates with the first and second brake assemblies and causes the first and second brake assemblies to engage or disengage the cantilever and support arms. When the brakes disengage, the workpiece is free to rotate around the first and second axes so as to permit convenient repositioning of the workpiece.

7 Claims, 4 Drawing Sheets

WORK-PIECE POSITIONER AND METHOD

The present application is a divisional application of U.S. patent application Ser. No. 10/244,205, filed on Sep. 16, 2002, which is currently pending.

BACKGROUND OF THE INVENTION

1. Field of the Invention

The present invention relates generally to a workpiece positioner, and more particularly to a positioner for supporting and positioning a motorcycle fender.

2. Discussion of Related Art

During manufacture of a vehicle, for example a motorcycle, it is often necessary for a vehicle body part to be supported so that a person can assemble, grind, prepare, paint, or otherwise work on the body part. Devices for supporting the body part during the manufacture process are commercially available. Some of these devices are rigid stands. Generally, rigid stands do not allow for positioning and repositioning of the body part. It is sometimes desirable to position and reposition the body part for comfort, convenience or efficiency.

Other devices include an adjustable stand that can allow the body part to be positioned and repositioned. The adjustable stand can be unbalanced by the weight of the body part and the force applied to the part, which can be significant.

In addition, efficiency can decrease if mounting, positioning and repositioning the body part is time intensive, difficult and cumbersome. It is desirable to increase efficiency by reducing the time, the degree of difficulty, and ease with which the body part is mounted, positioned, and repositioned.

SUMMARY OF THE INVENTION

The present invention is directed toward a workpiece holder or positioner that is easily adjustable to conveniently re-orient the workpiece while securely locking the workpiece in a desired orientation. In accordance with the present invention, the positioner includes a cantilever arm that defines a first axis and has a first end and a second end. A support arm defines a second axis and has a first end and a second end. The support arm is attached to the second end of the cantilever arm. A mounting head receives the workpiece and is attached to the second end of the support arm. The support arm is selectively rotatable around the second axis, and the cantilever arm is selectively rotatable around the first axis. In accordance with one aspect of the invention, a counterweight is attached to the support arm to counterbalance the weight of the workpiece.

In accordance with another aspect of the invention, a first brake assembly engages the cantilever arm to releasably secure the cantilever arm against rotation around the first axis. A second brake assembly is operable to engage the support arm to releasably secure the support arm against rotation around the second axis. A brake actuator assembly communicates with the first and second brake assemblies and is manually operable to engage and disengage the first and second brake assemblies. When the brakes are disengaged, the cantilever arm and support arm are free to rotate about their longitudinal axes and thereby permit reorientation or repositioning of the workpiece.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
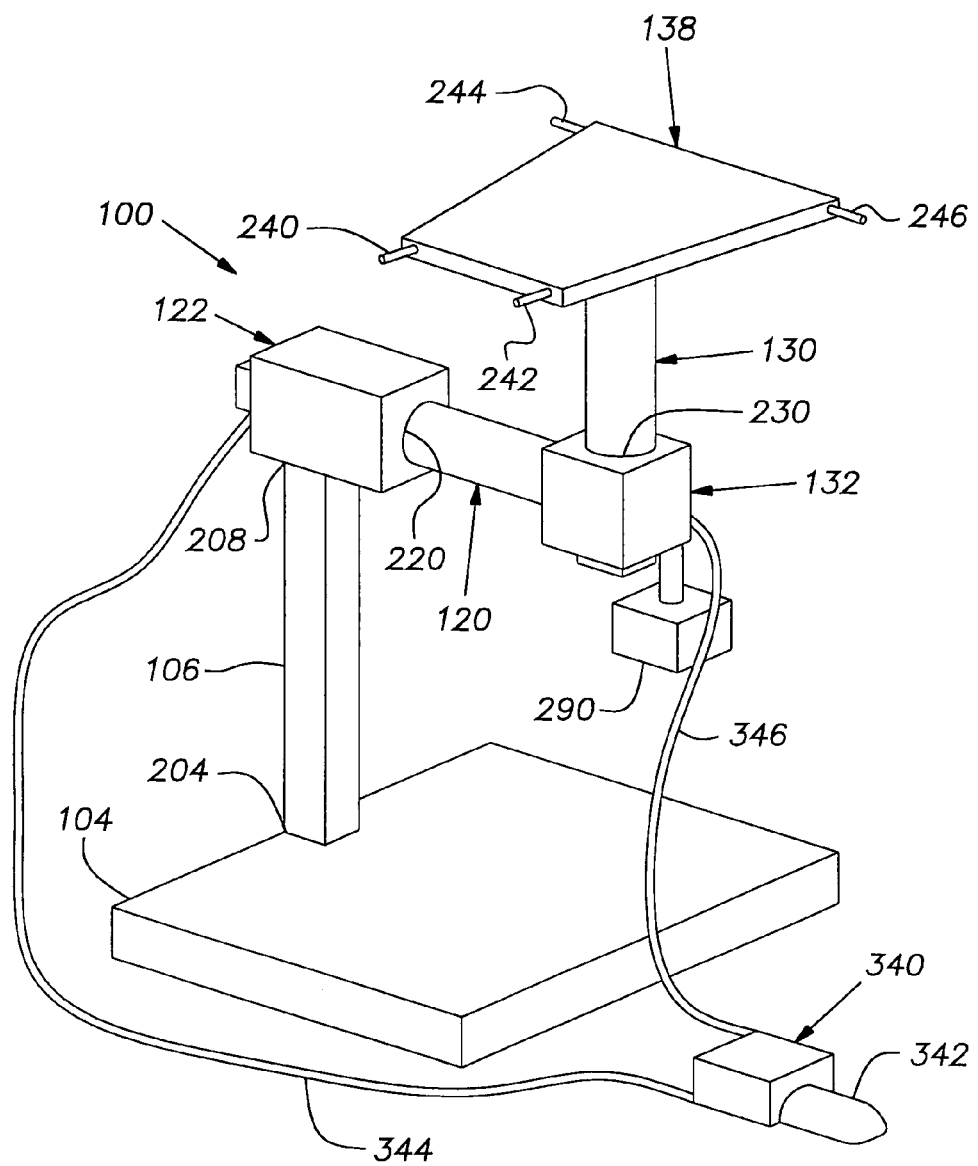
FIG. 1 is an elevated perspective view of a positioner in accordance with a first embodiment of the invention.
Figure 2:
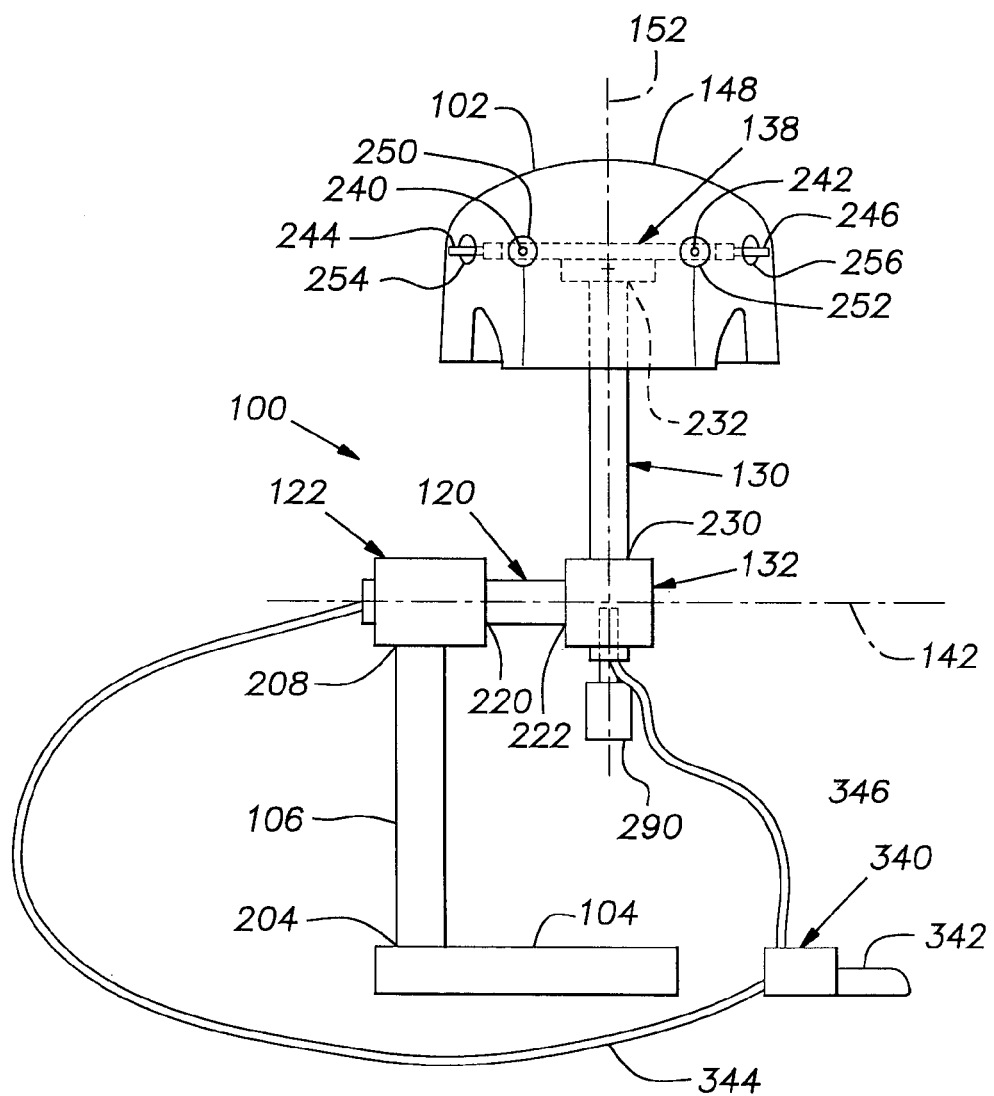
FIG. 2 is a schematic front view of the positioner of FIG. 1 with a fender mounted thereon.
Figure 3:
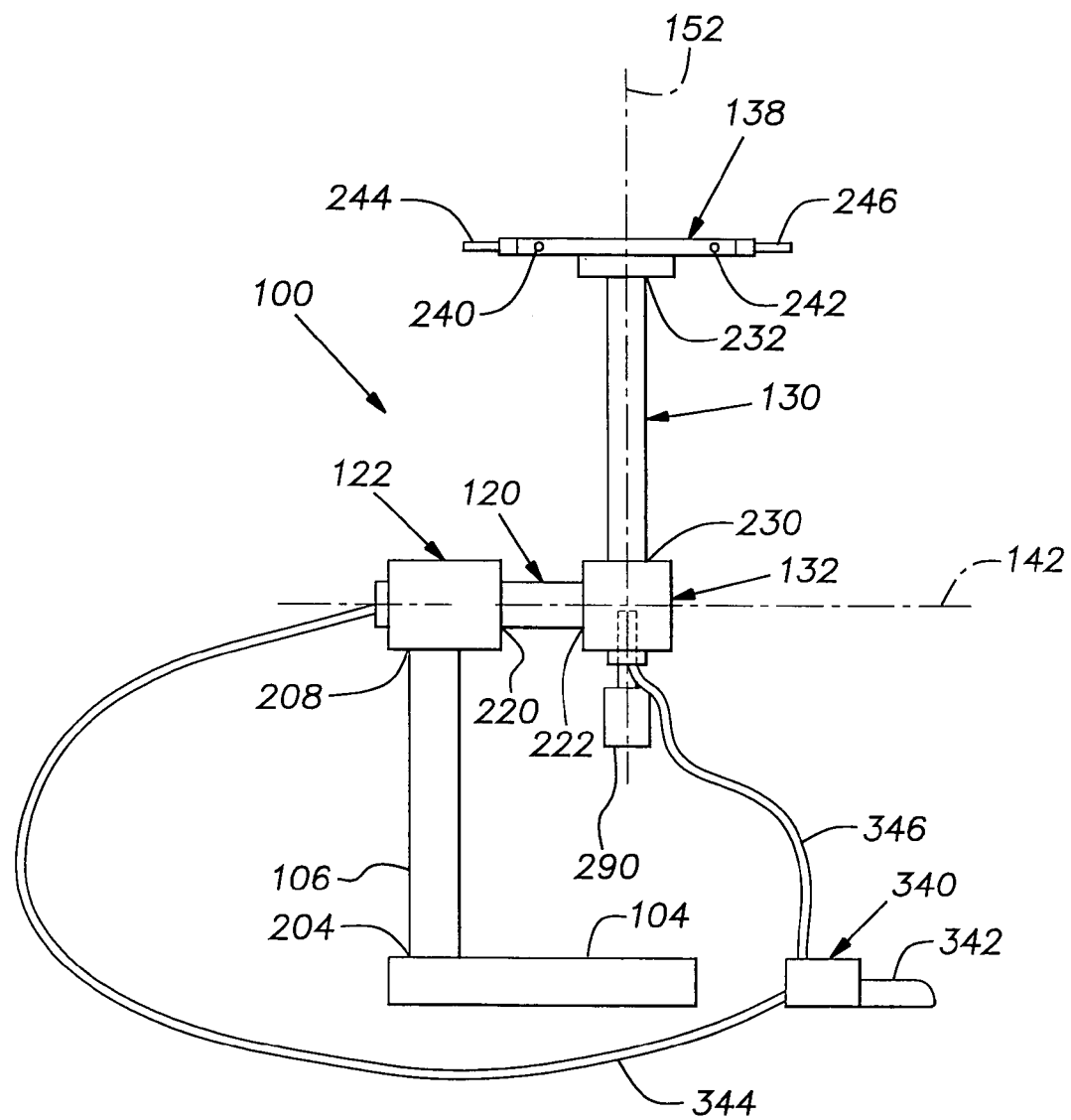
FIG. 3 is a schematic front view of the positioner shown in FIG. 2.
Figure 4:
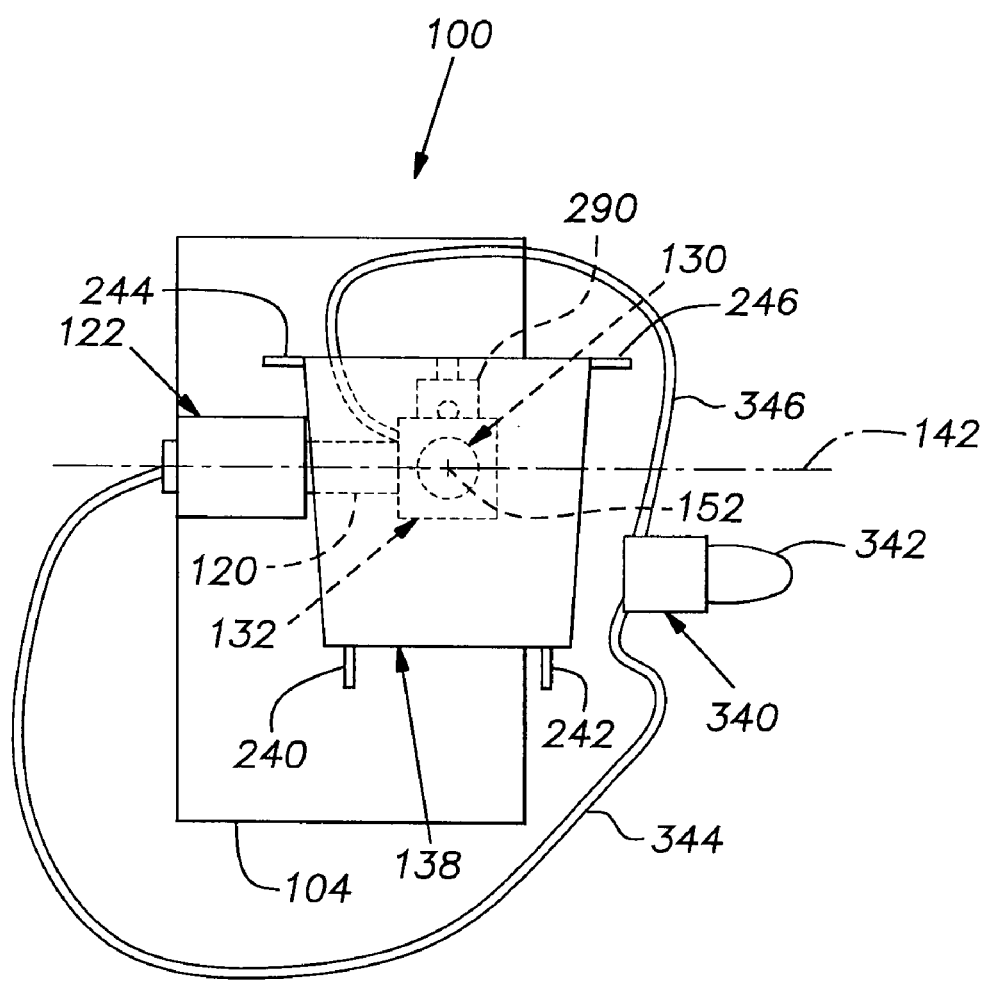
FIG. 4 is a schematic top view of the positioner shown in FIG. 2.

With reference to the drawings, a workpiece positioner 100 for positioning a workpiece, for example a motorcycle fender 102, according to a first embodiment of the invention is illustrated. The positioner 100 supports the fender 102 (FIG. 2) so as to orient the fender 102 in a desired position. The fender 102 can be worked on in the desired position and may be selectively repositioned, as described further hereinafter.

The positioner 100 includes a base plate 104, a base leg 106, a cantilever arm 120, a first brake assembly 122, a support arm 130, a second brake assembly 132, and a mounting head 138.

The cantilever arm 120 defines a longitudinal or first axis 142 and is adapted to rotate around the first axis 142. The support arm 130 defines a longitudinal or second axis 152 and is adapted to rotate around the second axis 152. As will be appreciated, the first axis 142 is generally horizontal while the second axis 152 is generally perpendicular to the first axis.

The base plate 104 is sufficiently wide so as to provide stability to the positioner 100 during operation. If desired, the base plate 104 can be bolted to a floor so as to further increase the stability of the positioner 100.

The base leg 106 is generally vertical and has a first or lower end 204 secured to the base plate 104 and a second or upper end 208 secured to a housing of the first brake assembly 122. The base plate 104 and base leg 106 are immovably affixed to one another and cooperate to define a base of the positioner 100. The base leg 106 is immovably affixed to the housing of the first brake assembly 122 so as to retain the first brake assembly 122 in a fixed location relative to the base plate 104. The base leg 106 is offset relative to a center of the base plate 104 to provide a counterbalancing force to the cantilever arm 120, as illustrated.

The cantilever arm 120 is generally horizontal, that is, parallel to the base plate 104 and perpendicular to the base leg 106, and has a first end 220 and a second end 222. The first end 220 of the cantilever arm is received within the first brake assembly 122, while the second end of the cantilever arm 120 is affixed to the second brake assembly 132 such that the second brake assembly 132, support arm 130, and mounting head 138 move together with the cantilever arm 120 as it is rotated upon release or disengagement of the first brake assembly 122, described hereinafter.

The support arm 130 has a first end 230 rotatably received within the second brake assembly 132 and a second end 232 secured to the mounting head 138. As will be appreciated from the foregoing, the support arm 130 is adapted to rotate with the cantilever arm 120 around the first axis 142, as well as about its longitudinal axis, referred to herein as the second axis 152. Accordingly, the support arm 130 can be rotated out of the generally vertical orientation illustrated in the drawing figures.

As will be appreciated by those skilled in the art, each of the first and second brake assemblies 122, 132 include bearings or similar structures by means of which the cantilever arm 120 and support arm 130, respectively, are secured thereto for rotation around their longitudinal axes 142, 152. The first and second brake assemblies 122, 132 also include brake mechanisms that are adapted to engage the cantilever arm 120 and support arm 130, respectively, to secure the arms against undesired rotation. Such brakes can take on any of several functionally equivalent forms. For example, the portions of the cantilever and support arms 120, 130 disposed within the first and second brake assemblies 122, 132, respectively, may include radially extending flanges (not shown) that may be frictionally engaged by brake pads (not shown) of the first and second brake assemblies 122, 132. Such brake pads may be air, hydraulic, or mechanically actuated. Alternatively, the brake assemblies 122, 132 may include band-type clamping structures that are movable into and out of frictional engagement with the circumference of the cantilever arm 120 and support arm 130. Again, the actuating mechanism for such band-type clamping structures may be any known in the art. Therefore, due to the fact that braking assemblies suitable for use in the present construction are well known to those skilled in the art, and may be used interchangeably, the specific structure of the braking assemblies will not be described further hereinafter.

The first brake assembly 122 engages the cantilever arm 120 to releasably secure the cantilever arm 120 in a desired position. When the first brake assembly 122 is disengaged, the cantilever arm 120 is free to rotate around the first axis 142. Similarly, the support arm 130 is rotatably secured to the second brake assembly 132 such that, upon disengagement of the second brake assembly 132, the support arm 130 is free to rotate around the second axis 152 to permit desired repositioning of the support arm 130 and the mounting head 138.

A brake actuator assembly 340 includes an actuator or foot pedal 342, a first hose 344, and a second hose 346. The first hose 344 extends from the actuator 342 to the first brake assembly 122. The second hose 346 extends from the actuator 342 to the second brake assembly 132. The actuator 342 is connected to a pressurized fluid source (not shown) and controls the delivery of pressurized fluid to the first and brake assemblies 122, 132. More specifically, when the actuator 342 is depressed, pressurized fluid is supplied to the first and second brake assemblies 122, 132 via the first and second hoses 344, 346, causing the brakes to disengage and permitting the cantilever arm 120 and support arm 130 to rotate about their axes 142, 152. Similarly, release of the actuator 342 cuts off fluid pressure the first and second brake assemblies 122, 132 (preferably also directing fluid within the hoses 344, 346 to atmosphere, if air, or to a recollection circuit, if liquid, via a bleed valve), and causes the brakes to re-engage and lock the cantilever arm 120 and support arm 130 against further rotation.

As noted from the foregoing, in a preferred embodiment, the brakes 122, 132 are normally engaged, and are biased toward the engaged position so as to prevent rotation about the respective axes 142, 152 upon the loss of fluid pressure. Actuating the brake actuator disengages the brakes 122, 132 so as to allow rotation about the respective axes 142, 152. Although brakes employing fluid pressure (i.e., air, hydraulic) are used in this example, purely mechanical braking systems and methods are known to those of ordinary skill in the art and may be substituted therefor.

The mounting head 138 is preferably rigidly affixed to the second end 232 of the support arm 130 and is operable to receive and support the fender 102. Specifically, the mounting head 138 has two rigid pins 240, 242 and two retractable, spring-loaded pins 244, 246 that engage the fender 102. Because the mounting head 138 is attached to support arm 130, the mounting head 138 can be rotated around both the first axis 142 and the second axis 152.

The fender 102 has an elongated fender body 148 that defines four apertures 250, 252, 254, 256, each of which is adapted to receive one of the pins 240, 242, 244, 246. The rigid pins 240, 242 are fixed and can extend through the corresponding apertures 250, 252 defined by the fender 102. The retractable pins 244, 246 are spring-loaded and can be moved against the spring bias into a retracted position. In the normal or extended position, the retractable pins 244, 246 extend through the corresponding apertures 254, 256.

Alternative embodiments include differing numbers of pins, and some of the pins include differing biasing means. For example, the differing biasing means can include hydraulic and electrical biasing means. Naturally, the apertures 250, 252, 254, 256 are provided in the fender 102 to facilitate eventual mounting to a motorcycle, so the number, arrangement, and position of the pins 240, 242, 244, 246 will, to some extent, be customized to each object to be held by the device.

Preferably, a counterweight 290 is attached to the housing of the second brake assembly 132 and extends in a direction opposite to that of the support arm 130. The counterweight 290 is of sufficient weight to counterbalance the fender 102.

During operation, the first and second brake assemblies 122, 132 are engaged so as to lock the cantilever arm 120 and support arm 130 and, hence, the mounting head 138, in position. The fender 102 is mounted on the mounting head 138. Specifically, the fender body 148 is oriented so that the apertures 250, 252 align with the corresponding pins 240, 242. The fender body 148 is moved relative to the mounting head 138 so that the pins 240, 242 extend through the apertures 250, 252. The spring pins 244, 246 retract or move inwardly against the bias of the springs until the corresponding fender body apertures 254, 256 are aligned therewith, at which point the spring pins 244, 246 snap through the apertures 254, 256 to secure and releasably mount the fender 102 onto the mounting head 138.

If the fender 102 needs to be repositioned, the actuator 342 is depressed to disengage the first and second brake assemblies 122, 132. The fender 102 is then grasped and moved to reposition it as desired while the counterweight 290 helps balance the fender 102 and facilitate repositioning thereof. When the fender 102 is in a desired position, the actuator 342 is released. Releasing the actuator 342 re-engages the brakes 122, 132 and locks the arms 120, 130 in position and, thus, secures the fender 102 in the desired orientation so that work can be conveniently performed on the fender 102.

In alternative embodiments, the first and second brake assemblies are individually engaged and disengaged. Also, relative movement around the various axes may be controlled by a brake assembly controller. In yet other embodiments, none, one or more than three air brakes and corresponding hoses are used. Further, alternative brake types are used, for example, mechanical, hydraulic, and electrical brake types as well as alternative means of communication and control of the brakes are contemplated. It is also contemplated that the mounting head will be adjustably secured to the support arm to permit further angular adjustment of the fender position. Naturally, the connection between the support arm 130 and the mounting head 138 may include a mechanical lock or a third brake assembly, similar to the first and second brake assemblies 122, 132, to selectively control reposition of the mounting head 138 about the support arm 130.

The embodiments described herein are examples of structures, methods, and systems having elements corresponding to the elements of the invention recited in the claims. This written description may enable those skilled in the art to make and use embodiments having alternative elements that likewise correspond to the elements of the invention recited in the claims. The intended scope of the invention thus includes other structures, methods and systems that do not differ from the literal language of the claims, and further includes other structures, methods, and systems with insubstantial differences from the literal language of the claims.

What is claimed is:

1. A method of adjustably supporting a workpiece in a stationary position, comprising the steps of:
    mounting the workpiece on a positioner, the positioner comprising a counterweight, a first arm, a second arm, a first brake assembly and a second brake assembly, wherein said first arm defines a longitudinal first axis and is selectively rotatable about said longitudinal first axis, said second arm defines a longitudinal second axis and is selectively rotatable about said longitudinal second axis, said first brake assembly being associated with said first arm and being operable to prevent said first arm from rotating about said longitudinal first axis, said second brake assembly being associated with said second arm and being operable to prevent said second arm from rotating about said longitudinal second axis, said workpiece being mounted to said positioner so as to be selectively movable with said first and second arms about said longitudinal first and second axes;
    counterbalancing the workpiece with the counterweight;
    operating the first brake assembly so as to release said first arm and thereby permitting rotation of said workpiece around said longitudinal first axis;
    operating said second brake assembly simultaneously with said first brake assembly so as to release said second arm and thereby permitting rotation of said workpiece around the longitudinal second axis; and,
    when said workpiece has been manually repositioned to a desired orientation corresponding to a desired rotational position of said first and second arms, operating said first and second brake assemblies simultaneously to hold said first and second arms in said desired rotational positions.

2. A method of adjustably supporting a workpiece in a stationary position, comprising the steps of:
    mounting the workpiece on a positioner, the positioner comprising a counterweight, a first arm, a second arm, a first brake assembly and a second brake assembly, wherein said first arm defines a longitudinal first axis and is selectively rotatable about said longitudinal first axis, said second arm defines a longitudinal second axis and is selectively rotatable about said longitudinal second axis, said first brake assembly being associated with said first arm and being operable to prevent said first arm from rotating about said longitudinal first axis, said second brake assembly being associated with said second arm and being operable to prevent said second arm from rotating about said longitudinal second axis, said workpiece being mountable to said positioner so as to be selectively movable with said first and second arms about said longitudinal first and second axes, wherein the workpiece defines a plurality of apertures and the positioner further comprises a mounting head that is secured to said second arm, said mounting head having a plurality of mounting pins, at least one of the mounting pins being a retractable mounting pin;
    pushing the workpiece onto the mounting head so as to retract the retractable mounting pin;
    aligning said retractable mounting pin with one of said plurality of apertures;
    inserting said mounting pin through said one of said plurality of apertures so as to secure the workpiece to the mounting head;
    counterbalancing the workpiece with the counterweight;
    operating the first brake assembly so as to release said first arm and thereby permitting rotation of said workpiece around said longitudinal first axis;
    operating said second brake assembly so as to release said second arm and thereby permitting rotation of said workpiece around the longitudinal second axis;
    when said workpiece has been manually repositioned to a desired orientation corresponding to a desired rotational position of said first and second arms, operating said first and second brake assemblies to hold said first and second arms in said desired rotational positions.

3. A method of manually adjustably supporting and repositioning a workpiece on a positioner, said positioner comprising a counterweight, a first arm extending in a first direction, a second arm extending generally perpendicular to said first arm, a mounting head secured to said second arm, a first brake assembly and a second brake assembly, wherein said first arm defines a longitudinal first axis and is selectively rotatable about said longitudinal first axis, said second arm defines a longitudinal second axis and is selectively rotatable about said longitudinal second axis, said second arm being secured to said first arm and being rotatable with said first arm about said longitudinal first axis, said first brake assembly being associated with said first arm and being operable to prevent said first arm from rotating about said longitudinal first axis, said second brake assembly being associated with said second arm and being operable to prevent said second arm from rotating about said longitudinal second axis, said method comprising the steps of:
    securing said workpiece to said mounting head;
    counterbalancing the workpiece with the counterweight attached to said second brake assembly;
    operating the first brake assembly so as to release said first arm and thereby permitting rotation of said workpiece around said longitudinal first axis;
    operating said second brake assembly so as to release said second arm and thereby permitting rotation of said workpiece around the longitudinal second axis;
    manually rotating said workpiece about at least one of said longitudinal first and second axes so as to move said workpiece into a desired orientation corresponding to a desired rotational position of said first and second arms;
    operating said first and second brake assemblies to hold said first and second arms in said desired rotational positions and said workpiece in said desired orientation.

4. The method as defined in claim 3, wherein the first and second brake assemblies are operated independent of one another.

5. The method as defined in claim 4, wherein the first and second brake assemblies are operated simultaneously.

6. The method as defined in claim 5, wherein the workpiece defines a plurality of apertures and said mounting head comprises a plurality of mounting pins, at least one of the mounting pins being a retractable mounting pin, and wherein said step securing the workpiece to the mounting head includes the steps of:

pushing the workpiece onto the mounting head so as to retract the retractable mounting pin;

aligning said retractable mounting pin with one of said plurality of apertures; and, inserting said mounting pin through said one of said plurality of apertures so as to secure the workpiece to the mounting head.

7. The method as defined in claim 1, wherein each of said first and second brake assemblies includes a pneumatic brake actuator assembly.

* * * * *